United States Patent
Desimone et al.

(10) Patent No.: US 10,402,105 B2
(45) Date of Patent: *Sep. 3, 2019

(54) DATA PROTECTION WITH MULTIPLE SITE REPLICATION

(71) Applicant: OVERLAND STORAGE, INC., San Diego, CA (US)

(72) Inventors: Dennis Desimone, Escondido, CA (US); Michael H. Reider, Escondido, CA (US); Kenneth Geist, San Diego, CA (US); Victoria Gonzalez, Escondido, CA (US)

(73) Assignee: Overland Storage, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,621

(22) Filed: May 30, 2017

(65) Prior Publication Data

US 2017/0364288 A1 Dec. 21, 2017

Related U.S. Application Data

(63) Continuation of application No. 14/551,543, filed on Nov. 24, 2014, now Pat. No. 9,671,965, which is a continuation of application No. 13/619,394, filed on Sep. 14, 2012, now Pat. No. 8,904,132, which is a continuation of application No. 13/371,062, filed on Feb. 10, 2012, now Pat. No. 8,386,705, which is a
(Continued)

(51) Int. Cl.
*G06F 3/06* (2006.01)
*G06F 11/14* (2006.01)

(52) U.S. Cl.
CPC ............ *G06F 3/0619* (2013.01); *G06F 3/065* (2013.01); *G06F 3/0607* (2013.01); *G06F 3/067* (2013.01); *G06F 3/0613* (2013.01); *G06F 3/0646* (2013.01); *G06F 3/0664* (2013.01); *G06F 3/0665* (2013.01); *G06F 3/0686* (2013.01); *G06F 3/0689* (2013.01); *G06F 11/1456* (2013.01); *G06F 11/1461* (2013.01)

(58) Field of Classification Search
CPC .... G06F 3/0619; G06F 3/0607; G06F 3/0613; G06F 3/0646; G06F 3/065; G06F 3/067
See application file for complete search history.

(56) References Cited

U.S. PATENT DOCUMENTS 4,467,421 A 8/1984 White et al.
5,333,277 A * 7/1994 Searls .................. G06F 3/0601
710/300
(Continued)

FOREIGN PATENT DOCUMENTS

WO WO 00/04454 A1 1/2000

*Primary Examiner* — Ryan Bertram
(74) *Attorney, Agent, or Firm* — Knobbe, Martens, Olson & Bear, LLP

(57) ABSTRACT

Systems and methods for replicating data from a first site to a second site remote from said first site are described. An embodiment includes storing compressed data on a hard disk appliance, reading said data without decompressing said data, sending said data over a wide-area-network (WAN) in a compressed state, and storing said data on a second hard disk appliance remote from said first hard disk appliance in its compressed state without performing an additional compression operation.

7 Claims, 3 Drawing Sheets

Related U.S. Application Data continuation of application No. 11/357,742, filed on Feb. 17, 2006, now Pat. No. 8,122,191.

(60) Provisional application No. 60/654,714, filed on Feb. 17, 2005.

(56) References Cited

U.S. PATENT DOCUMENTS

| | | | |
|---|---|---|---|
| 6,070,224 | A | 5/2000 | LeCrone et al. |
| 6,173,359 | B1 | 1/2001 | Carlson et al. |
| 6,260,110 | B1 | 7/2001 | LeCrone et al. |
| 6,351,792 | B1 | 2/2002 | Milillo |
| 6,425,050 | B1 | 7/2002 | Beardsley et al. |
| 6,477,628 | B1 * | 11/2002 | Bish ............... G06F 3/0613 |
| | | | 711/154 |
| 6,557,073 | B1 | 4/2003 | Fujiwara et al. |
| 6,834,324 | B1 | 12/2004 | Wood |
| 7,162,604 | B1 | 1/2007 | Nourmohamadian et al. |
| 7,440,965 | B1 | 10/2008 | Pruthi et al. |
| 7,941,619 | B1 * | 5/2011 | Rossi ............... G06F 11/1458 |
| | | | 707/625 |
| 2003/0070056 | A1 | 4/2003 | Greco |
| 2004/0030668 | A1 | 2/2004 | Pawlowski et al. |
| 2004/0034811 | A1 | 2/2004 | Trimmer et al. |
| 2004/0044842 | A1 | 3/2004 | Trimmer et al. |
| 2004/0111251 | A1 | 6/2004 | Trimmer et al. |
| 2004/0153614 | A1 | 8/2004 | Bitner et al. |
| 2004/0172512 | A1 | 9/2004 | Nakanishi et al. |
| 2004/0267903 | A1 | 12/2004 | Ido et al. |
| 2005/0010730 | A1 | 1/2005 | Kano |
| 2005/0021950 | A1 | 1/2005 | Rothbarth et al. |
| 2005/0060356 | A1 | 3/2005 | Saika |
| 2005/0108486 | A1 | 5/2005 | Sandorfi |
| 2005/0187992 | A1 | 8/2005 | Prahlad et al. |
| 2005/0193235 | A1 | 9/2005 | Sandorfi et al. |
| 2006/0074520 | A1 | 4/2006 | Trimmer et al. |
| 2006/0101213 | A1 | 5/2006 | Morita |
| 2006/0123189 | A1 | 6/2006 | Bitner et al. |
| 2006/0149889 | A1 * | 7/2006 | Sikha ............... G06F 11/1469 |
| | | | 711/100 |
| 2006/0200623 | A1 | 9/2006 | Gonzalez et al. |
| 2009/0313311 | A1 | 12/2009 | Hoffmann et al. |

* cited by examiner

DATA PROTECTION WITH MULTIPLE SITE REPLICATION

CROSS-REFERENCE TO RELATED APPLICATIONS

This application is a continuation of U.S. patent application Ser. No. 14/551,543, filed on Nov. 24, 2014, which is a continuation of U.S. patent application Ser. No. 13/619,394, filed on Sep. 14, 2012, issued on Dec. 2, 2014 as U.S. Pat. No. 8,904,132, which is a continuation of U.S. patent application Ser. No. 13/371,062, filed on Feb. 10, 2012, issued on Feb. 26, 2013 as U.S. Pat. No. 8,386,705, which is a continuation of U.S. patent application Ser. No. 11/357,742, filed on Feb. 17, 2006, issued on Feb. 21, 2012 as U.S. Pat. No. 8,122,191, which claims priority under 35 U.S.C. § 119(e) to U.S. Provisional Application No. 60/654,714, filed on Feb. 17, 2005. All of these applications are incorporated by reference in their entireties. Furthermore, any and all priority claims identified in the Application Data Sheet, or any correction thereto, are hereby incorporated by reference under 37 C.F.R. § 1.57.

BACKGROUND OF THE INVENTION

Field of the Invention

This invention relates to systems and methods for storing electronic data and has applicability to enterprise data backup systems.

Description of the Related Art

Improving backup and restore performance is a continuing desire of enterprise data managers. In a typical computing environment, magnetic disk drives are used as the primary storage mechanism for active data, whereas magnetic tapes are used for data backup and archive. The magnetic disks provide rapid and reliable access to data, but they are perceived as being more expensive. In addition, since they are non-removable, they are at risk of physical disasters. Magnetic tape storage is perceived as being less expensive and, because tape cartridges are removable, they can be moved to offsite locations to protect against physical disasters. Therefore, most backup software in use has been optimized for use with magnetic tape technology.

Reading and writing data on a tape requires that the reel be unwound until the desired location is found. Once in the appropriate location, the read or write operation can begin. Because of the mechanical nature of this access, read and write operations are slow and often fail. In many situations, it would be beneficial to provide the random access speed and the reliability of a magnetic disk drive to backup systems while still allowing for the possibility of offsite storage. As a result, a new category of magnetic disk systems is becoming popular called virtual tape technology.

Virtual tape systems are magnetic disk systems that transparently emulate a tape drive and/or a tape library. They provide the same physical connections to a host, such as SCSI, Fibre Channel or Ethernet. This allows them to connect in the same way as the tape systems they are replacing or augmenting. They also provide the same logical response to tape drive and robot commands, which allows the same backup software to remain in use. The emulator is also able to send the host computer the expected tape-drive interrupt signals such as beginning-of-tape, end-of-tape, and inter-record-gap. In this case, such a system can plug right in to an existing tape based storage system without a need for the user to change the storage network or software environment.

Although such systems have been successful in the marketplace, the currently available devices still do not fully take advantage of the properties of disk storage in a way that provides maximum flexibility and usefulness.

SUMMARY OF THE INVENTION

In one embodiment, a method of replicating data from a first site to a second site remote from the first site is provided. The method comprises storing compressed data on a hard disk appliance, and reading the data without decompressing the data. The data is sent over a wide-area-network (WAN) in a compressed state, and stored on a second hard disk appliance remote from the first hard disk appliance in its compressed state without performing an additional compression operation.

In other embodiments, the invention comprises methods of managing data storage. In one embodiment, such a method includes backing up data on a first hard disk storage appliance that is configured to emulate a tape based storage appliance, and replicating the data on a second hard disk storage device remote from the first hard disk storage device in response to an unload command sent to the first hard disk storage device. In another embodiment, a method of managing data storage comprises backing up data on a first hard disk storage appliance that is configured to emulate a tape based storage appliance, and replicating the data on a second hard disk storage device remote from the first hard disk storage device in response to completion of a scheduled backup operation. In another embodiment, a method of managing data storage comprises backing up data on a first hard disk storage appliance that is configured to emulate a tape based storage appliance, and replicating the data on a second hard disk storage device remote from the first hard disk storage device during the process of backing up the data on the first hard disk storage device. In another embodiment, a method of managing data storage comprises backing up data on a first hard disk storage appliance that is configured to emulate a tape based storage appliance according to a first user defined periodic schedule; replicating the data on a second hard disk storage device remote from the first hard disk storage device according to a second user defined periodic schedule.

DETAILED DESCRIPTION OF THE PREFERRED EMBODIMENT

Preferred embodiments of the present invention will now be described with reference to the accompanying Figures, wherein like numerals refer to like elements throughout. The terminology used in the description presented herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 1:
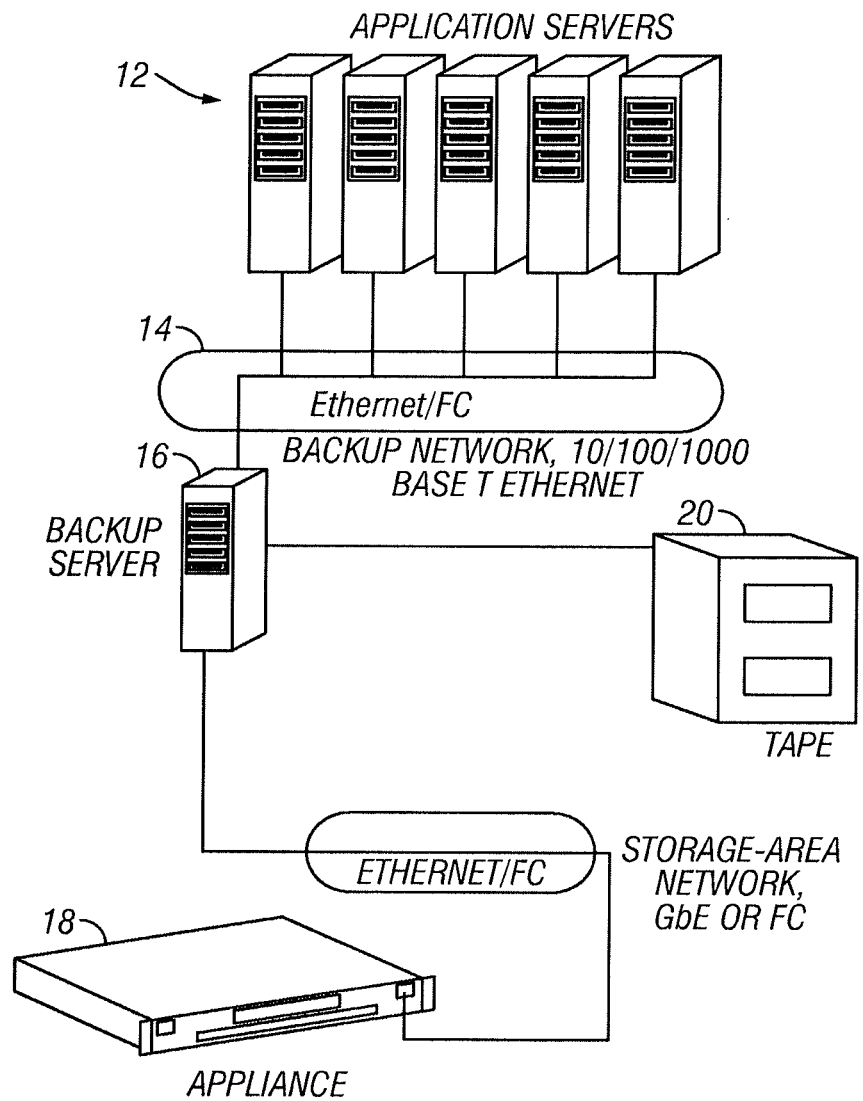
FIG. 1 is a schematic of one embodiment of a data backup system.

FIG. 1 illustrates one example of a system including a hard disk based appliance with tape emulation features that can be used in a data protection environment. In this system, application servers 12 are connected to each other and to a backup server 16 over a network 14. The backup server 16 communicates with the disk appliance 18 and to the tape system 20. In some embodiments, the backup server communicates directly with the disk appliance 18, and the tape system is controlled by the disk appliance directly, rather than by the backup server 16. Additional features of such embodiments are described in U.S. application Ser. No. 11/356,726, filed on Feb. 17, 2006, entitled Tape Library Emulation with Automatic Configuration and Data Retention, which application is hereby incorporated by reference in its entirety. It will be appreciated that multiple disk appliances and tape systems may be connected in the storage area network.

Backups from application servers 12 are received by appliance 18 (via the backup server 16) and are written to disk based (preferably RAID) storage of appliance 18. The disk appliance 18 may include an internal disk drive array, and may alternatively or additionally connect to an external disk drive array through a storage adapter which may, for example, be configured as a Fibre Channel or SCSI interface.

Appliance 18 and/or backup server 16 may then automate the process of transferring the data stored on disk media to physical tape media in tape system 20 for archival purposes. The transfer of the disk stored data to physical tape media may be done without user intervention on a periodic basis.

It will be appreciated that the hardware components, functionality, and software present in the backup server 16, disk appliance 18, and tape drive/library can be combined and/or separated in various ways. For example, the disks of appliance 18 can be located in a separate device. As another example, the tape drive/library 20 hardware and functions can be integral with the disk appliance 18 rather than provided as a separate unit. As described above, the appliance 18 can be configured to interact with the backup server 16 in exactly the same manner and format of communication as the tape drive/library 20. In this way, software on the backup server 16 that is configured to communicate and store data using tape commands and tape data formats can utilize the disk based appliance 18 without modification. Speed is still improved in many cases such as restore operations, however, because tape commands such as moving to a desired block can be accomplished on disk with the virtual tape much faster than a physical tape cartridge in a physical tape drive.

Figure 2:
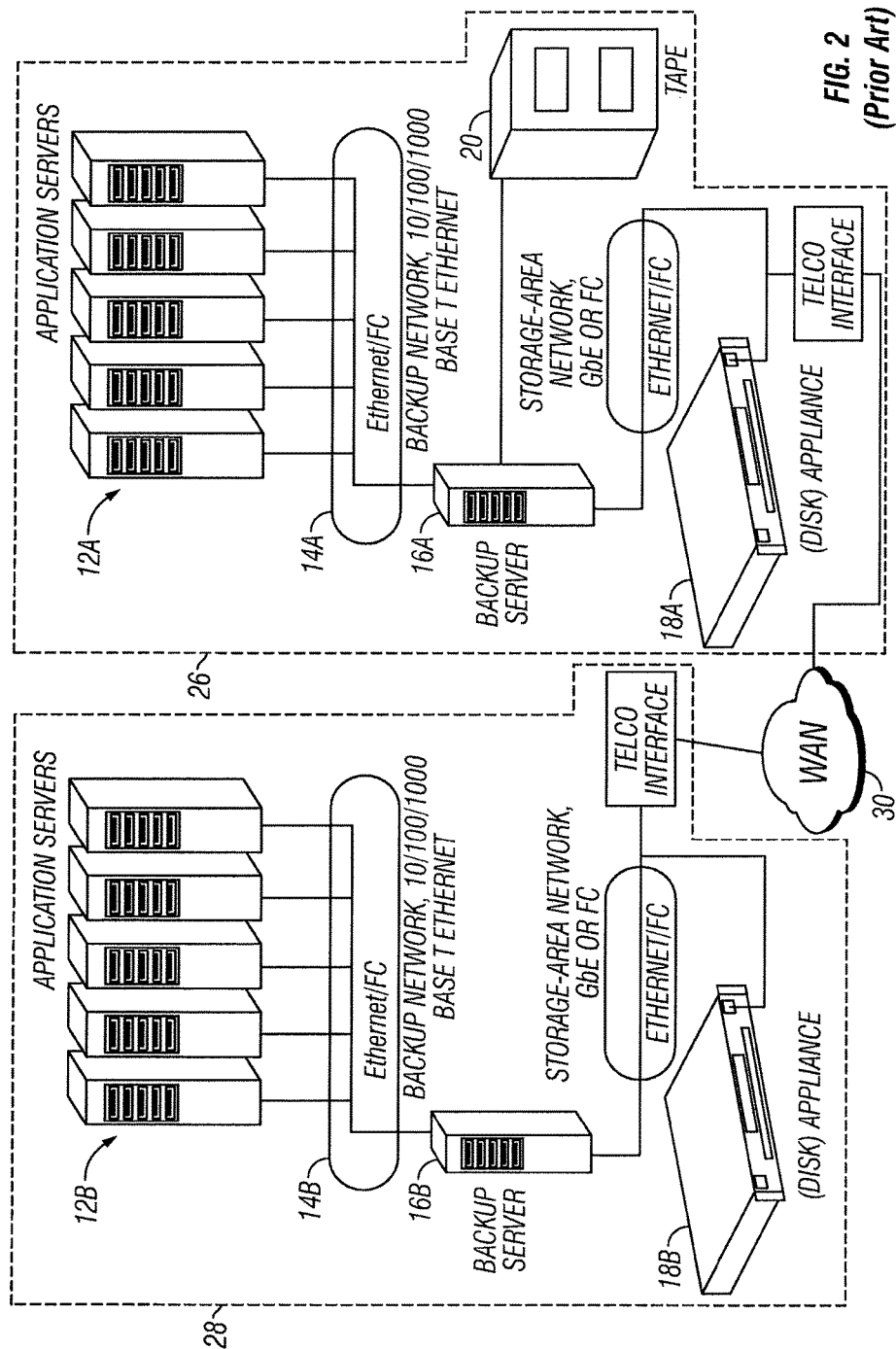
FIG. 2 is a diagram of a multi-site replication system
Figure 3:
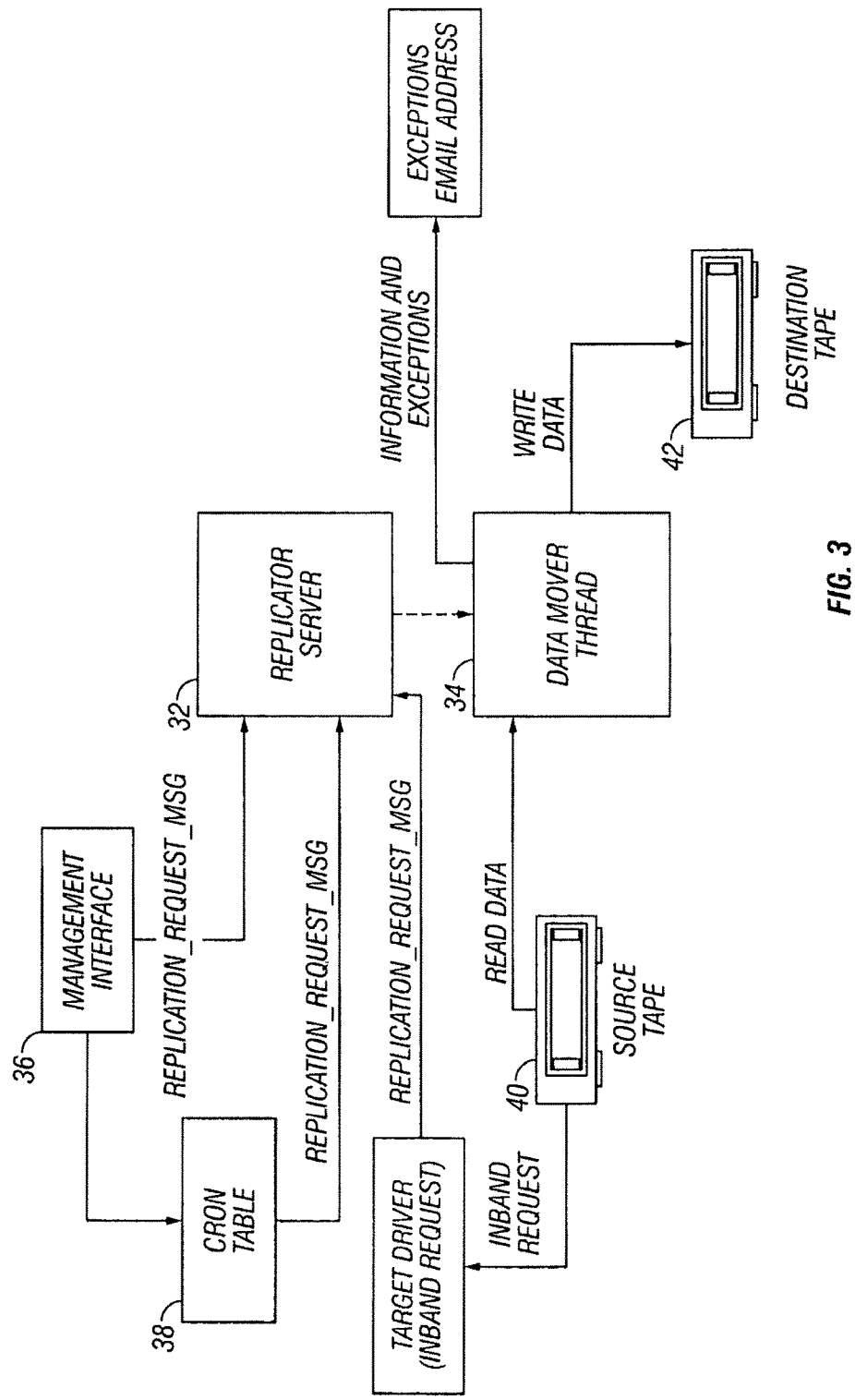
FIG. 3 is a block diagram of the operation of one embodiment of the system of FIG. 2.

Typically, for enterprises utilizing data backup hardware and procedures as described in FIG. 1, each location of the enterprise would have a system as illustrated in FIG. 1 which would be separately operated and managed so as to backup and archive data for each separate location. Tapes were typically physically moved offsite from each location to a central facility. This results in inefficiency and expense. FIGS. 2 and 3 illustrate a multi-site replication architecture in accordance with some embodiments of the invention that avoids many of the problems encountered in enterprises having multiple separate locations with data backup requirements. In this embodiment, both a central location 26 and a satellite location 28 include most or all of the system components as outlined above with regard to FIG. 1.

In the embodiment of FIG. 2, the two locations 26, 28 are in communication over a wide area network (WAN) 30 which may include the Internet, for example. In some advantageous embodiments, several satellite locations are coupled through the WAN to a common central location. The facilities 26, 28 are remote from one anther, where remote means that they are coupled through a WAN. They will typically also be geographically remote. As illustrated in FIG. 2, in this architecture, it is not necessary for the satellite location 28 to have an onsite tape storage system 20. Rather, data files that are backed up onto appliance 18 are transferred over the WAN 30 for archiving onto physical tapes by the tape storage system 20 at the central location 26. In some advantageous embodiments, files are moved from the satellite location 28 to the central location 26 in replication processes that transfer images of virtual tapes on disk appliance 18B to virtual tapes on disk appliance 18A. Replication processes are illustrated in more detail in FIG. 3.

Referring now to FIG. 3, the replication process is managed by a replication server 32 typically running at the central location 26. After receiving a replication request, the replication server spawns a data mover thread 34 that runs to completion. The replication request can come from a management interface 36 accessible to system users. The management interface can be used to issue immediate replication requests, or can be used to schedule timed or periodic replication requests that are managed by a scheduling utility 38 such as the Linux cron daemon. In this way, data backups to disk appliance 18B can be performed on a first periodic schedule defined with the backup server software, and replication processes can be performed on a second different schedule defined by the replication server if desired. Replication can also be performed in conjunction with backup processes as described below.

The data mover performs block reads from the source target 40 and block writes to the destination target 42 during a replication process. In some advantageous embodiments, the source tape and drive and the destination tape and drive are virtual tape system devices implemented in the disk based appliances 18B and 18A.

There are four primary ways in which a user may replicate a tape. Scheduled replication allows the user to specify a time in which regular copies are made of a Source Target. In this process the user identifies a Source Target for replication and a Destination Target. If the Destination Target is a Media Changer device, the user will identify which volume to use as the backup medium. The user will set the schedule parameters. This may include time, day-of-week and/or daily. Immediate replication is performed similarly, but a replication request command is sent to the replication server immediately instead at a future scheduled time.

Post-Backup Replication is provided by using a small utility that will send an in-band request to the backed-up tape device. The request may consist of a vendor-specific write Command Descriptor Block (CDB). The data portion of this write may contain a buffer with the replication parameters in key/value form. Upon identifying an in-band replication request, the Target Driver will parse the message and send a Replication Request Message to the Replication Server.

Auto-Replication on Unload is another example of Post-Backup replication. In this case, during initial replication setup, a choice under the schedule parameters may include a "Replication on Unload" option. When the target driver detects an "Unload," a replication request message is sent via the normal In-Band mechanism. The replication server will determine if the unloaded source target is scheduled for a "Replicate on Unload." If it is, then normal replication processing is started.

Because data transfer over the WAN is typically slow compared to local network transfers, sending and receiving compressed data will greatly reduce the amount of data transferred over a potentially slow link. To implement this, if the data on the source tape is already compressed, a special Read CDB operation code can be used to read the data without decompressing it. If the data on the source tape is uncompressed, it can be compressed after a regular Read operation and before transmitting to the destination tape.

Furthermore, a special Write CDB operation code can be used for writes to the destination tape. The special write basically instructs the driver to write the data as compressed without first compressing it.

This approach can thus be implemented with two vendor-specific CDBs, one for Reads and one for Writes. An alternative approach could use a vendor-specific Mode Page.

An example Read Compressed CDB can be constructed to follow the standard SSC Read:

| Byte/Bit | 7 | 6 | 5 | 4 | 3 | 2 | 1 | 0 |
|---|---|---|---|---|---|---|---|---|
| 0 | | | | Operation Code (0xC1) | | | | |
| 1 | Logical Unit Number | | | Reserved | | SILI | | Fixed |
| 2 | | | | (MSB) | | | | |
| 3 | | | | Transfer Length | | | | |
| 4 | | | | (LSB) | | | | |
| 5 | | | | Control | | | | |

SILI:
0 = report incorrect block length when it occurs
1 = do not report incorrect block length
Fixed:
0 = return one variable length block with length in bytes specified by the Transfer Length
1 = return the number of fixed length blocks specified by by the Transfer Length; Block length is specified in the the Mode Select command.

If the data is uncompressed, a check condition is returned with a special code in the sense data. When the data is returned uncompressed, it is compressed before transmission to the Destination Target. An alternative approach is to have the READ COMPRESSED call always return compressed data. If it is uncompressed, the driver will compress it before returning it.

An example Write Compressed CDB can be constructed to follow the standard SSC Write:

| Byte/Bit | 7 | 6 | 5 | 4 | 3 | 2 | 1 | 0 |
|---|---|---|---|---|---|---|---|---|
| 0 | | | | Operation Code (0xC2) | | | | |
| 1 | Logical Unit Number | | | Reserved | | | | Fixed |
| 2 | | | | (MSB) | | | | |
| 3 | | | | Transfer Length | | | | |
| 4 | | | | (LSB) | | | | |
| 5 | | | | Control | | | | |

Fixed:
0 = return one variable length block with length in bytes specified by the Transfer Length
1 = return the number of fixed length blocks specified by the Transfer Length; Block length is specified in the the Mode Select command.

The above systems and methods can thus improve existing backup system efficiency and ease of use. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of managing data storage, comprising:
   backing up data on a first hard disk storage device that is configured to emulate a tape based storage appliance according to a first user defined periodic schedule;
   determining whether to compress the data based on a write Command Descriptor Block (CDB) operation code, wherein a data portion of the operation code comprises a buffer; and
   replicating the data on a second hard disk storage device remote from the first hard disk storage device according to a second user defined periodic schedule,
   wherein the second user defined periodic schedule is based on a parameter of the first hard disk storage device, wherein the parameter is stored in the buffer of the data portion of the operation code.

2. The method of claim 1 further comprising:
   storing compressed data on a hard disk appliance;
   reading said data without decompressing said data;
   sending said data over a wide-area-network (WAN) in a compressed state;
   storing said data on the second hard disk storage device remote from said first hard disk storage device in its compressed state without performing an additional compression operation.

3. The method of claim 1, wherein the replicating of said data on the second hard disk storage device remote from said first hard disk storage device is in response to an unload command sent to said first hard disk storage device.

4. The method of claim 1, wherein the replicating of said data on the second hard disk storage device remote from said first hard disk storage device is in response to completion of a scheduled backup operation.

5. The method of claim 1, wherein the replicating of said data on said second hard disk storage device remote from said first hard disk storage device is performed during the process of backing up said data on said first hard disk storage device.

6. The method of claim 1, further comprising:
   receiving a replication configuration for said first hard disk storage device, said replication configuration including an unload replication parameter; and
   replicating said emulated tape on said second hard disk in response to an unload command sent to said first hard disk storage device;
   wherein said replicating is further based on said unload replication parameter for said first hard disk storage device.

7. The method of claim 1, wherein the data backed up on the first hard disk storage device according to the first user defined periodic schedule is replicated on the second hard disk storage device according to the second user defined periodic schedule.

* * * * *